Sept. 25, 1934.    V. R. BROWN    1,974,530
ELECTROMAGNETIC PIPE ORGAN ACTIONS
Filed May 9, 1932    2 Sheets-Sheet 1
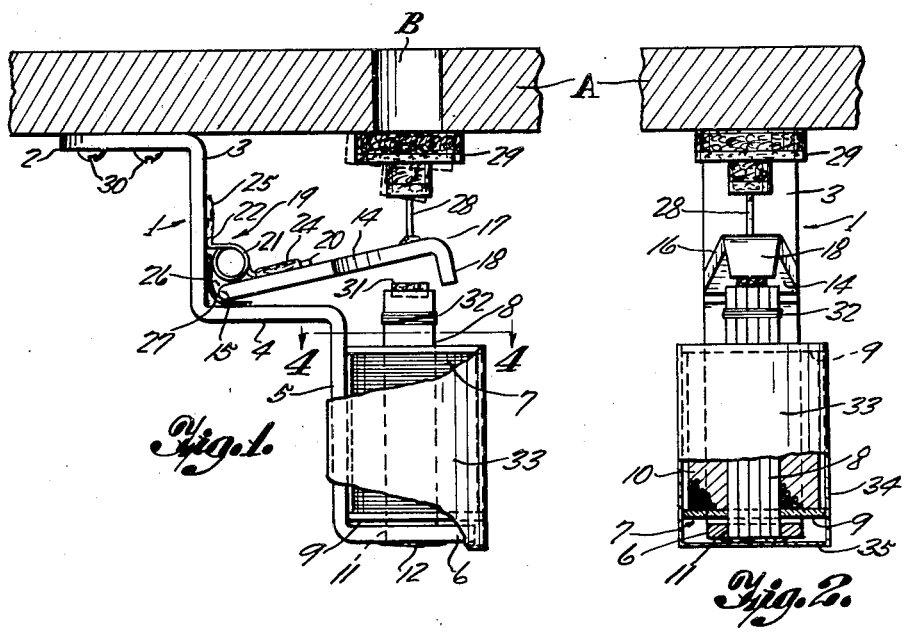
INVENTOR.
VERNIE ROY BROWN
BY Adam E. Fisher
ATTORNEY.

Sept. 25, 1934.  V. R. BROWN  1,974,530
ELECTROMAGNETIC PIPE ORGAN ACTIONS
Filed May 9, 1932  2 Sheets-Sheet 2
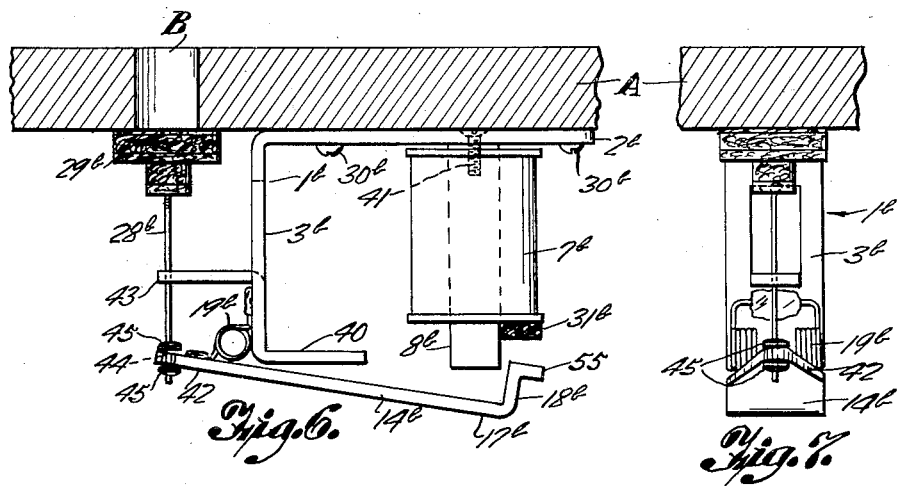
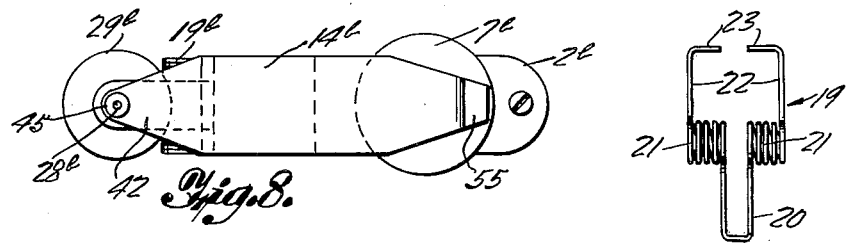
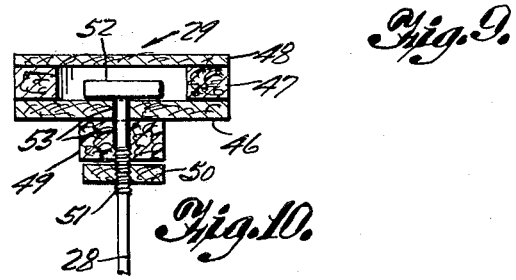
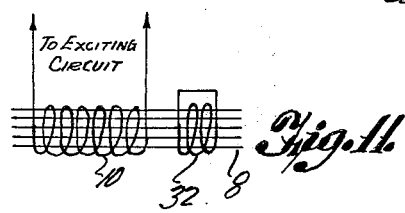
INVENTOR.
VERNIE ROY BROWN
BY Adam E. Fisher
ATTORNEY.

Patented Sept. 25, 1934

1,974,530

UNITED STATES PATENT OFFICE 1,974,530

ELECTROMAGNETIC PIPE ORGAN ACTIONS

Vernie Roy Brown, St. Louis, Mo., assignor to Geo. Kilgen & Son, Inc., St. Louis, Mo., a corporation of Missouri Application May 9, 1932, Serial No. 610,129

19 Claims. (Cl. 84—339)

My invention relates to improvements in electromagnetic pipe organ actions.

The main object of my invention is to provide an electromagnetically operated device of greatly improved form particularly adapted for use in opening and closing the valves of a pipe organ or in the construction of the mechanical and tonal elements of a pipe organ, but applicable as well to all other uses and installations requiring a device of its nature.

Another and important object is to provide an electromagnetically operated device of this kind employing a novel and efficient spring suspension for the movable element or armature in which a helically wound torsional coil spring performs both the function of hingedly supporting the armature and returning the same to its normal position after each movement and in which the spring itself lies in a position out of the magnetic circuit and so is not subject to the usual crystallization and breakage as would be encountered were the spring lying in the magnetic circuit.

Another object is to provide an electromagnetic device of this kind operating equally well on either alternating or direct current and so eliminating the necessity for generators, converters or rectifiers to provide direct current where only alternating current is commercially available, this use of alternating current being made possible by the spring suspension of the armature as aforesaid together with a particularly efficient form of electromagnet including a laminated core for minimizing eddy currents and a means for reducing and rendering harmless the usual fluttering and humming caused by the alternating current.

Another object is to provide a device of this kind including a novel and efficient supporting bracket for the electromagnet and armature, which bracket is so shaped and formed as to provide a bend or rest offset from the electromagnet and adapted to support one end of the armature and its suspension spring, thus removing said spring from the magnetic circuit and providing a short and direct return path for the magnetic flux set up by the electromagnet.

Another object is to provide a device of this kind including a supporting bracket, and mounted thereupon an electromagnet, an armature and suspension spring therefor as the essential parts, the resulting structure being thus simple, and efficient and having no pivoting, telescoping or sliding parts to wear and require attention after the device is installed.

A further object is to provide in a structure of this kind, means for operatively supporting an electromagnet in an upright, inverted or any intermediate position, as may be required to meet exigencies of various installations.

Still a further object is to provide a structure, which when used as a valve action for opening and closing the valve inlets of a pipe organ, and including a valve head for opening and closing said inlets, operates to draw the valve head from its seat at an angle and break the air seal gradually thus reducing the current necessary to operate the electromagnet. In addition the valve head is arranged so that it may be adjusted tightly or loosely on its support and secured in the position for most efficient operation.

With the foregoing and such other objects in view as may appear hereinafter the invention resides in the novel construction and arrangement of parts as will not be fully set forth and claimed, reference being had to the accompanying drawings as illustrating a preferred embodiment of the invention, and wherein:

Figure 1 is a side elevation of the invention as associated with the air valve of a pipe organ, a part of the pipe organ being shown in cross section.

Figure 2 is a front elevation of the structure shown in Figure 1, a part of the pipe organ being again shown in cross section.

Figure 3 is a plan view of the invention removed from the pipe organ.

Figure 4 is a section along the line 4—4 in Figure 1.

Figure 5 is a side view of a modified form of the invention showing the electromagnet mounted in a horizontal position.

Figure 6 is a side view of still another modification of the invention as applied to a pipe organ and showing the electromagnet mounted in an inverted position, a part of the pipe organ being shown in cross section.

Figure 7 is a front elevation of the structure shown in Figure 6, also showing a part of the pipe organ in cross section.

Figure 8 is an inverted plan view of the structure shown in Figure 6, but as removed from the pipe organ.

Figure 9 is a detail view of the armature suspension spring alone.

Figure 10 is an enlarged cross section through the valve and showing the upper portion of the valve stem.

Figure 11 is a diagrammatic view of the windings on the electromagnet.

Referring more particularly to the drawings, and to the embodiment of my invention shown in Figures 1 to 4 inclusive, I provide an angularly formed bracket 1, comprising a strip of iron or other magnetic material, the same being bent to provide a horizontally extended mounting or supporting ear 2, a downwardly extended spring mounting portion or leg 3, an outwardly turned magnetic shunt portion or armature rest 4, another downwardly turned portion or leg 5 and finally an outwardly turned electromagnet support arm 6. The several bends in the bracket 1 are substantially at right angles to one another, whereby in the intended location of the bracket in the pipe organ, as will be hereinafter described, the ear 2, rest 4 and arm 6 will be disposed in horizontal planes as shown in the drawings.

An electromagnet 7 is provided comprising a core 8, bobbin heads 9 and winding 10, the said core 8 preferably being square in cross section and formed of a number of laminations as shown, and of course being made of soft iron or similar magnetic material. The electromagnet 7 is mounted on the arm 6 of the bracket 1 by pressing the lower end of the core 8 through a square hole 11 in said arm, and welding the core and arm on its underside as shown at 12, but it is understood that any other method of mounting may be employed as desired. Preferably the distance between the center of the aperture 11 and the inner or adjacent face of the leg 5 is less than the radial distance from the center of the core to the outer periphery of the heads 9, and the arm 6 of the bracket is initially bent upward somewhat from a horizontal plane before the electromagnet is mounted. Then as the core 8 is pressed through the aperture 11 as described the bobbin heads 9 will engage said bracket leg 5 and force the arm 6 downward to its horizontal position, the result being that after the welding of the core to the arm, as shown at 12, a tension is exerted on the electromagnet by the bracket for holding the former securely in place. The sides of the bobbin heads 9 are preferably flattened as at 13 where they engage the bracket leg 5 to increase their contactual area therewith and present any rotation of the electromagnet.

The length of the electromagnet 7 is such that the upper bobbin head 9 falls substantially below the plane of the armature rest 4 and the core 8 extends at its upper end from the winding to a point substantially above the said rest 4. An armature 14 of material similar to the bracket 1 is provided and is rounded off at one end 15, while its other end is tapered at its sides 16 towards its extremity 17, which is bent downward at substantially right angles to form a lip 18. The length of the armature 14 thus formed is such that when its rounded end 15 is disposed adjacent the angular juncture of the rest 4 and leg 3 of the bracket the opposite or outer ends 17 will extend over the upper end of the core 8 of the electromagnet 7, and the lip 18 will lie in such position that it may swing downward alongside the core 8 as will be hereinafter pointed out. The armature is mounted in this position by a suspension spring 19 formed of a length of spring wire of either round, flat, or square cross section, bent intermediate its ends to provide a bight 20, and coiled or wound to form spaced axially aligned torsional coils 21, spaced substantially from the bight 20, the ends of the wire being extended from these coils 21 as shown at 22 and turned inwardly at some distance from the coils as at 23. The bight 20 of the spring is welded, brazed, soldered or otherwise secured at 24 to the upper face of the armature 14 and the ends 22 are similarly secured at 25 to the face of the spring mounting leg 3 in such position that the coils 21 are disposed in or adjacent the corner formed between the end 15 of the armature and the said leg 3. The coils 21 are so wound or set that the armature 14 is normally supported by the bight 20 in a position extending angularly upward and outward over the core 8 of the electromagnet 7, the outer extremity 17 of the armature resting a substantial distance above the end of the core 8 to permit a decided downward movement of the armature as will be set forth hereinafter. It will be noted that the rounded end 15 of the armature 14 does not extend fully into and contact the corner at the juncture of the rest 4 and leg 3 as designated at 26 and a buffer 27 of felt or similar material is placed in this corner between the armature and the rest 4 and leg 3.

A vertically arranged valve stem 28 is secured at its lower end by welding or otherwise to the armature 14 adjacent its outer end 17 and projects upwardly therefrom and a valve head 29 of felt or similar material is mounted on the upper end of this valve stem.

The device as described is adapted for mounting on the underside of the valve board A of the valve chamber of a pipe organ (not shown) and the bracket 1 is secured to this valve board A by screws 30 passed through the supporting ear 2. The position of the device is such that the valve head 29 rests in alignment with and against the lower margin of the valve opening B in the valve board A and normally seals the said opening from the air in the valve chamber.

In operation the electromagnet 7 is energized or excited by depressing the organ key or closing any other circuit or contact (not shown) in usual manner, thus magnetizing the core 8 and causing it to attract the armature 14 and pull the same downward against the tension of the suspension spring 19. The valve head 29 is thus pulled from its seat and air flows through the valve opening B and thence into the organ pipe in any usual manner. As the armature is pulled downward its outer end strikes a felt buffer or bumper 31 seated in or on the end of the core 8 and the inner rounded end 15 of the armature engages the felt buffer 27 thus rendering the action noiseless. The lip 18 on the armature being extended down near the margin of the core 8 and being adapted upon the energization of the magnet to pass down alongside that core, affords a strong and quick starting or initial pull for unseating the valve head 29 and admitting air to the valve opening B. When the organ key is released or the circuit otherwise broken the spring 19 will then return the armature and valve head to their normal positions closing the valve opening B. As the armature 14 swings downward as aforesaid it also moves endwise towards and into the corner formed at the juncture of the bracket leg 3 and rest 4 due to the arrangement of the suspension spring 19 which in effect acts as an eccentric hinge or pivot for the armature as will be understood. This action of the armature results in a novel and advantageous operation of the valve head 29 as will now be described. The valve chamber of which the valve board A is a part contains air under pressure to operate the organ pipes or other parts of the organ and the valve head 29 is held tightly to its seat by the air pressure in the valve chamber, this being what is termed in the trade as the "air seal". A strong initial pull on the valve head is thus necessary in order to break this air seal, resulting in a heavy current being taken by the electromagnet. In my structure as described this air seal is broken more readily due to the fact that the valve head as it leaves its seat is pulled sidewise along its seat in a direction slightly toward the bracket 1 while at the same time its edge remote from the bracket opens or moves away from its seat a trifle in advance, this position being indicated in somewhat exaggerated form in dotted lines in Figure 1. Air from the valve chamber may thus get "behind" the valve head 29 and in the valve opening B and aid in the opening of the valve as will be readily understood. The saving in current taken by my electromagnet by this arrangement and operation of the valve head over the current ordinarily used has been found in actual practice to be in the neighborhood of fifty percent and is therefore exceedingly worth while.

My suspension spring 19 not only affords this advantageous action of the valve head but in addition performs both the function of a pivot or hinge joint for the armature 14 and a return spring to return the armature to its normal position after each operation. Obviously there is no wear in the spring to cause looseness and rattle in its operation as is the case in the usual hinge or pivot joint, and friction is almost entirely absent. In the ordinary hinge or pivot there is not only mechanical friction present but there is also magnetic friction caused by the hinge lying in the magnetic circuit or path, which results in the armature being pulled tightly against its supporting element by the magnetism flowing through the hinge and augmenting the normal friction of the hinge or pivot connection.

The shape of the bracket 1 is such that the magnetic circuit is completed from the lower end of the core 8 through the arm 6, the leg 5, across the air gap between the upper end of the leg 5 to the armature 14 and thence back to the core, this being a much shorter path as well as a path of less resistance or reluctance than that thru the rest 4, leg 3 and spring 19 to the armature. This shorter path will of course be taken by the magnetic flux set up by the electromagnet and aside from increasing the efficiency of the electromagnet as a whole it is also evident that the spring 19 is thus removed from the magnetic circuit by this formation of the bracket. The usual crystallization and breakage common to springs located directly in the magnetic circuit is thus eliminated by this arrangement, and the life and efficiency of the spring is therefore greatly increased. The spring need not necessarily be made of steel, but may be of phosphor bronze or brass since it is not a part of the magnetic circuit. The rest 4 in effect forms a magnetic shunt to shunt the magnetic flux around and away from the spring 19.

When the electromagnet 7 is operated by alternating current the suspension spring 19 acts as a silencer or cushion to prevent the rattling or humming of the armature which usually occurs where the armature is hinged or pivoted in conventional form and especially after the hinge or pivot has been worn by use. The structure of the electromagnet 7 is also such as to render it particularly adaptable for use on alternating current due to the use of a square laminated core as described and shown, whereby hysteresis and eddy currents are minimized. In addition a "shading" coil 32 may be used when alternating current is used, this coil comprising one or more turns of insulated wire or other insulated and conductive material wound around the upper end of the electromagnet core 8, the resulting coil being connected together at its ends as shown diagrammatically in Figure 11. This shading coil thus acts as the secondary of a transformer and each time the winding 10 is positive the shading coil has an induced negative voltage and vice versa. The result is that the frequency of alternation of the current is doubled over that of the exciting frequency so that hum and fluttering of the armature is reduced to a minimum, this being a well known expedient for this purpose.

The arrangement and position of the armature 14 is such that at its downward stroke, its outer end 17 and lip 18 come to rest in a position very near and overlapping the end of the electromagnet core 8 and a strong sealing pull is thus afforded to hold the armature tightly against the buffer 31 and prevent fluttering of the armature and valve head 29 by the air rushing into the valve opening B. Such fluttering would cause interference with the tone of the organ pipe or other elements supplied with air from the valve opening B.

In the usual organ installation a great number of the devices are mounted in close proximity and to prevent any undesirable interaction or interference of the several inductive fields of the windings of the electromagnets, a shield 33 of thin metal may be provided around each of the electromagnets and the legs 5 of the brackets and the shield grounded in usual manner. As shown in the drawings this shield 33 is in the form of an open topped cap-like member having the sides 34 to slip over the electromagnet and the leg 5 of the bracket and the bottom 35 to enclose the lower end of the assembly, the shields being held in place by friction, welding or other suitable means.

Where it is desired to mount the electromagnets in a horizontal position or in a position in parallel alignment with the valve board A the structure shown in Figure 5 may be employed. In this embodiment of my invention the bracket 1a includes the mounting ear 2a and the downwardly turned leg 3a at the end of which the strip is bent horizontally outward and then back on itself to provide a doubled bend 36 forming a rest for the armature 14a. Below this bend 36 the strip is bent downward in alignment with the leg 3a to provide an electromagnet supporting leg 6a. The electromagnet 7a is mounted in a horizontal position on this leg 6a and extends outward beneath the bend 36, the core 8a, which in this case is of one piece or solid construction being secured to this leg 6a by a screw 37. At its outer end the core 8a is bent upwardly as shown at 38 and extends upward to or beyond a plane in alignment with the bend 36. The armature 14a is mounted on the bracket 1a by the suspension spring 19a in manner similar to the hereinbefore described embodiment of the invention and extends outwardly over the upper end of the core 8a and is normally held by the spring 19a in a position raised some distance above the end of the core. To illustrate a further modification in the construction of the armature an additional lip 39 is shown at some distance from the lip 18a initial pull on the armature and the buffer 31a is shown as glued or otherwise fixed on the underside of the armature between these lips in lieu of the mounting at the end of the core as hereinbefore described. The valve 29a is supported on its stem 28a above the outer end of the armature 14a and the device is mounted in the valve chamber and operates exactly as hereinbefore set forth.

In this case the magnetic return is through the leg 6a, bend 36, through the air gap to the armature and thence back to the core and the same advantages and efficiency of construction obtain in this construction as in the previous embodiment.

Still a further form of my invention is shown in Figures 6, 7 and 8 in which the electromagnet is mounted in an inverted position. In this construction the bracket 1b includes a relatively long mounting ear 2b, a downwardly turned leg 3b and an arm 40 extended back beneath and in parallelism with the ear 2b. The electromagnet 7b is mounted beneath the ear 2b as by a screw 41 and its core 8b extends downwardly at some distance from the end of the arm 40. The armature 14b is mounted on the leg 3b by the spring 19b similar to the spring mounting hereinbefore described but in this case the armature is supported at a position intermediate its ends instead of at one end, whereby one end 17b bearing the lip 18b extends out beneath the lower end of the core 8b while its other end passes beneath the arm 40 and extends outward beyond the leg 3b as designated at 42. The bracket 1b is secured by screws 30b to the underside of the valve board A of the valve chamber in such position that this end 42 of the armature falls beneath and in vertical alignment with the valve opening B. The valve head 26b has its stem 28b slidably extended through an aperture in the ear 43 bent outwardly from the leg 3b of the bracket and downwardly through an aperture 44 in the end 42 of the armature 14b. Stop nuts 45 are mounted on the stem 28b above and below the end 42 of the armature and the arrangement is such that the valve head 29b will be pulled from its seat as the electromagnet 7b is energized identically as described in previous embodiments and all the major advantages of construction and operation of these previous embodiments prevail as well in this case. The magnetic return flows through the ear 2b, the leg 3b, the arm 40 and thence through the air gap to the armature 14b and back to the core 8b. A buffer 31b is mounted on the end of the electromagnet 7b alongside the end of the core 8b and will be struck by an extended portion 55 of the armature 14b as the same operates as and for a purpose readily understood.

While the valve head 29 may be of any usual form a preferred form is illustrated in Figure 10 in which the head comprises a circular bottom piece 46 of fiber or similar relatively rigid material, a ring 47 of felt, and a top piece 48 of leather. Below the head a collar 49 of felt is provided and a nut 50 of leather is threaded on a threaded portion 51 of the valve stem 28. The stem 28 passes up through the collar 49 and the bottom piece 46 and is upset and flattened to form a head 52 at its upper end located within the ring 47, said stem passing through slightly oversize holes 53 in the collar and bottom plate. This arrangement is such that by loosening the nut 50 the valve head 29 may play or tilt from side to side on the stem and so adapt itself to irregularities in its seat, being then what is termed a "wabble or self-seating" valve. By tightening the nut 50 against the collar 49 the head 52 of the valve stem is pulled tight against the bottom piece 46 and the valve head is held rigid on its stem.

In all of the embodiments of my invention herein shown and described it will be evident that very few parts are used and that they are of the simplest construction possible. Thus the manufacture and installation of the devices are made easier and simpler and due to the fact that there are practically no working parts subject to wear maintenance work is greatly reduced. Further details of operation and advantages will be apparent to those skilled in the art.

The invention as described is capable of use in any other installations and for other purposes as well as for operating the valves of a pipe organ and such other uses are considered within the scope of this invention.

While I have herein set forth certain preferred embodiments of my invention it is understood that I may vary from the same in structural details so as best to construct a practical device for the purposes intended, not departing from the spirit of the invention and within the scope of the appended claims.

I claim:

1. In a device of the kind described including a valve-board having a valve opening therethrough and a valve for said opening, a bracket connected to the valve-board, an electromagnet supported on the bracket, and an armature connected to said valve resiliently suspended from the bracket in operative relationship with the electromagnet, a portion of the bracket being bent toward the electromagnet from the point at which the armature is suspended to form in combination with adjacent portions of the armature a magnetic shunt to shield the resilient suspending means for the armature.

2. In a device of the kind described including a valve-board having a valve opening therethrough and a valve for said opening, a bracket connected to the valve-board, an electromagnet supported on the bracket, an armature connected to said valve, a torsional coil spring pivotally connecting the bracket and armature, the said spring being located at a point substantially out of the path of maximum intensity of the magnetic flux traveling through the bracket and armature.

3. In a device of the kind described including a valve-board having a valve opening therethrough and a valve for said opening, a bracket connected to the valve-board, an electromagnet supported on the bracket, an armature connected to said valve and a torsional coil spring pivotally connecting the armature to the bracket, a portion of the bracket being bent toward the electromagnet from the point at which the spring is connected whereby a shunt is formed for the magnetic flux set up by the electromagnet in the bracket and armature to shield the resilient suspending means for the armature.

4. In a device of the kind described including a valve-board having a valve opening therethrough and a valve for said opening, a bracket connected to the valve-board, an electromagnet mounted on the bracket, an armature connected to said valve, a suspension spring for the armature, the said spring comprising a length of spring wire bent to provide spaced axially aligned torsional coils, and a connecting bight and end portions extended from opposite ends of the coils, the said bight portion and end portions being secured to the armature and bracket and the coils being tensioned to support the armature in operative relationship with the electromagnet.

5. In a device of the kind described including a valve-board having a valve opening therethrough and a valve for said opening, a bracket connected to the valve-board of magnetic material including an attaching ear, a leg extended perpendicularly from said ear, a magnetic shunt portion extended perpendicularly from the leg, a second leg extended out perpendicularly from said shunt portion, and a magnet supporting arm extended perpendicularly from said second leg, an electromagnet on said supporting arm, and an elongated armature connected to said valve, spring connected at one end to the bracket at a point adjacent the juncture of the first named leg and the magnetic shunt portion to pivotally and resiliently mount the armature, the free end of the armature being disposed over the working end of the magnet, the intermediate portion of the armature being disposed in alignment with and in proximity to the said shunt portion of the bracket, the shunt serving to shield the said spring.

6. In a device of the kind described including a valve-board having a valve opening therethrough and a valve for said opening, a bracket connected to the valve-board formed of magnetic material and comprising a mounting ear, a leg at right angles to the mounting ear, the said leg being bent outwardly and back on itself intermediate its ends to form a magnetic return bend, an electromagnet secured to the leg at one side of the bend, and an armature connected to said valve resiliently suspended at one end from the bracket at the point of juncture of the leg and the magnetic return bend and on the side of the latter remote from the electromagnet.

7. In a device of the kind described including a valve-board having a valve opening therethrough and a valve for said opening, a bracket connected to the valve-board formed of magnetic material and comprising a mounting portion, a leg at right angles to the mounting portion, an electromagnet seated on the mounting portion, substantially spaced from and with its core arranged in parallelism with the said leg, an arm extended from the end of the leg toward the electromagnet, and an armature connected to said valve, a spring attached at one end to the bracket at the juncture of the leg and arm resiliently and pivotally connecting the armature, the free end of said armature being extended over the said magnet.

8. In a device of the kind described including a valve-board having a valve opening therethrough and a valve for said opening, a support connected to the valve-board of magnetic material an electromagnet having its core connected at one end with said magnetic material, a connected portion of the material being extended towards the opposite working end of the magnet, and an elongated armature connected to said valve having a free end disposed transversely over the working end of the magnet, the opposite end thereof being disposed over and extended outwardly beyond the said extended portion of the magnetic supporting material, and a spring forming a resilient and pivotal support for said end of the armature.

9. In a device of the kind described including a valve-board having a valve opening therethrough and a valve for said opening, an angularly formed bracket connected to the valve-board of magnetic material, an electromagnet having its core connected at one end to a point on said bracket, there being an arm of the bracket disposed laterally of the opposite working end of the magnet, the said arm extending from a point adjacent said working end to a point substantially removed therefrom, an elongated armature connected to said valve disposed along over said arm and across the working end of said magnet, and a spring forming a resilient and pivotal support for the end of the armature overlying the lateral arm of the bracket.

10. In a device of the kind described including a valve-board having a valve therethrough and a valve for said opening, a support connected to the valve-board of magnetic material, an electromagnet having one end of its core connected with said material, a connected portion of the material being disposed laterally adjacent the opposite working end of the magnet to constitute a magnetic shunt, an elongated armature aligned over the said magnetic shunt and across the working end of the magnet, and a spring forming a resilient and pivotal support for the end of the armature connected to said valve overlying said magnetic shunt, the said support lying substantially outside the magnetic path as established by the magnet thru the said shunt and adjacent parts of the armature.

11. In a device of the kind described including a valve-board having a valve opening therethrough and a valve for said opening, a bracket connected to said valve-board, an electromagnet mounted on the bracket, an armature connected to said valve, a spring resiliently and pivotally connecting said armature at one end to the bracket at a point remote from the electromagnet and extended at its free end over the electromagnet, and a magnetic shunt portion of the bracket completing the magnetic circuit to the armature at a point remote from the movable connection thereof.

12. In a device of the kind described including a valve-board having a valve opening therethrough and a valve for said opening, a bracket connected to said valve-board including a leg, an electromagnet mounting arm and armature rest bent at right angles from opposite ends of the leg and extended in opposite directions, an electromagnet mounted on the arm, an armature connected to said valve movably connected at one end to the outer end portion of the armature rest and extended along and beyond said rest over the electromagnet.

13. In a device of the kind described including a valve-board having a valve opening therethrough and a valve for said opening, a bracket connected to said valve-board including a leg, an electromagnet mounting arm and armature rest bent outwardly from opposite ends of the leg and extended in opposite direction therefrom, an electromagnet mounted on the arm, an armature connected to said valve movably supported at one end at a point adjacent the outer end of the armature rest and extended at its free end over the electromagnet, the junction between the leg and armature rest lying adjacent an intermediate portion of the armature.

14. A valve action for mounting on the valve board of a pipe organ adjacent a valve opening therein and comprising a support, an arm movably connected at one end to the support, the opposite free end of the arm extending in alignment with the valve opening, and a valve head carried on the free end of the arm and adapted to open and close the said valve opening upon vibration of the arm, the said movable connection between the arm and support being a spring affording a resilient, pivotal and eccentric motion whereby to impart an oblique and lateral motion of the valve head relative to the valve opening as the valve head vibrates.

15. A device of the kind described including a valve-board having a valve opening therethrough and a valve for said opening, means for operating said valve including a bracket and an electromagnet supported thereon, an armature resiliently suspended from a portion of said bracket in operative relationship to said electromagnet and connected to said valve, said bracket having an electromagnet-supporting portion, a portion perpendicular thereto and extending toward said armature, a third portion, said third portion being perpendicular to the second mentioned portion and extending away from said electromagnet, and a fourth portion, said fourth portion being an armature-supporting portion perpendicular to said last mentioned portion and connected to said valve-board.

16. A device of the kind described including a valve-board having a valve opening therethrough and a valve for said opening, means for operating said valve including a bracket and an electromagnet supported thereon, an armature in operative relationship to said electro-magnet and connected to said valve, a spring pivotally connecting said armature to a portion of said bracket, a part of said bracket in combination with said armature defining the circuit of maximum magnetic intensity of the flux through said electro-magnet, said spring being located outside of the zone enclosed by said circuit, and said bracket having a shunt shielding said spring from the magnetic flux of said circuit.

17. A device according to claim 16 wherein said shunt is disposed at a right angle to the longitudinal axis of the electromagnet and extends in a direction away from said axis.

18. A device according to claim 16 wherein said shunt is substantially parallel to the longitudinal axis of the electromagnet and is disposed between the electro-magnet and the armature.

19. A device according to claim 16 wherein said shunt is disposed at a right angle to the longitudinal axis of the electro-magnet and extends toward said axis.

VERNIE ROY BROWN.